Patented Oct. 10, 1922.

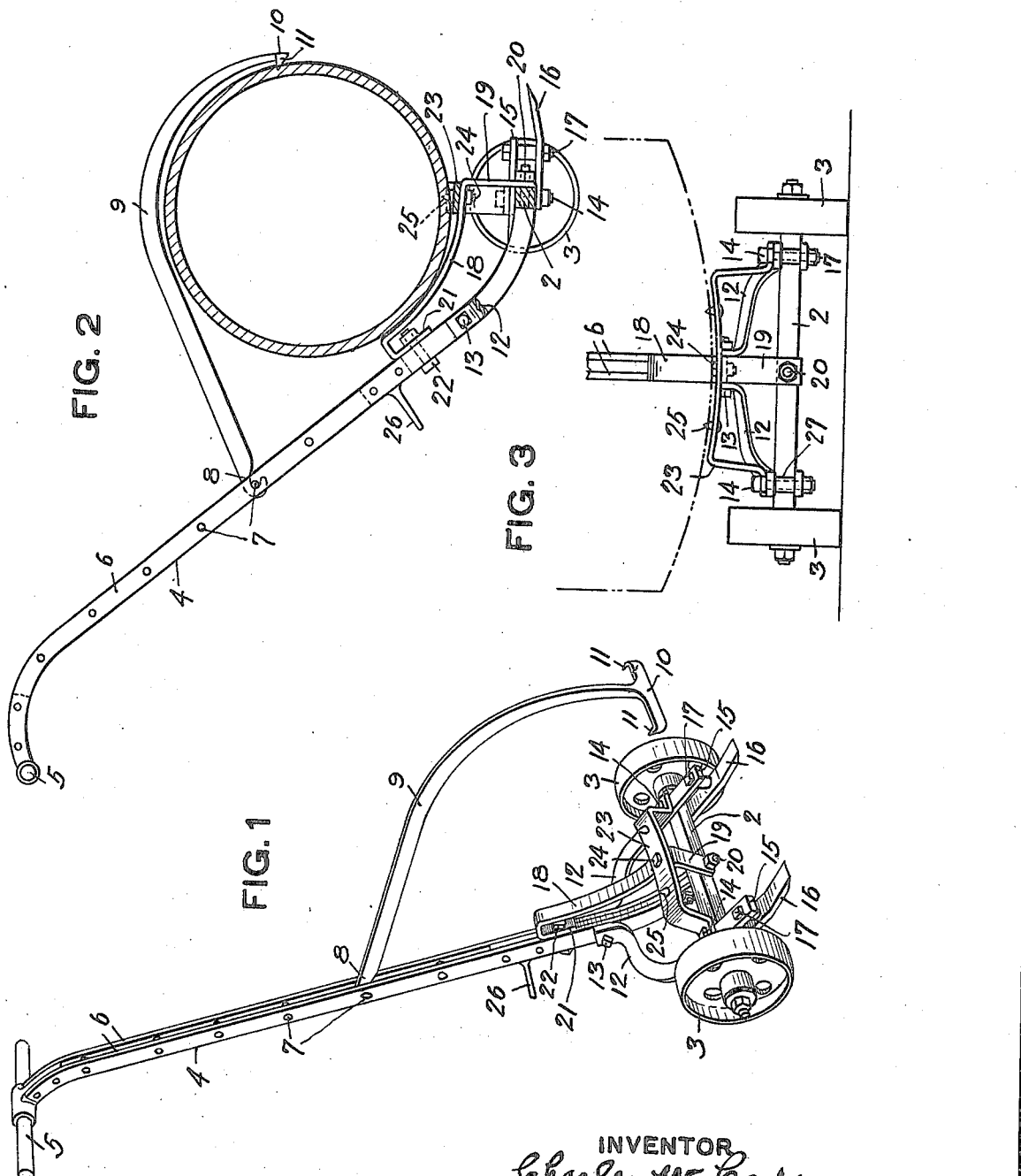

1,431,630

UNITED STATES PATENT OFFICE.

CHARLES W. CADE, OF BELLEVUE, PENNSYLVANIA, ASSIGNOR TO McKINNEY MANUFACTURING COMPANY, OF PITTSBURGH, PENNSYLVANIA, A CORPORATION OF PENNSYLVANIA.

TRUCK.

Application filed June 2, 1920. Serial No. 386,085.

*To all whom it may concern:*

Be it known that I, CHARLES W. CADE, a citizen of the United States, and resident of Bellevue, in the county of Allegheny and State of Pennsylvania, have invented a new and useful Improvement in Trucks; and I do hereby declare the following to be a full, clear, and exact description thereof.

My invention relates to hand-operated trucks of the kind commonly known as "one-man trucks" that are intended to be operated by one person, and it has special reference to trucks designed for handling barrels and similar round packages.

The object of my invention is to provide a truck of the character indicated which shall be simple and rugged in construction, and which may be readily operated to handle barrels of various sizes and to deliver the barrels either at the same floor level from which they were taken, or at a different elevation.

In the accompanying drawings, Fig. 1 is a perspective view of a truck constructed in accordance with my invention; Fig. 2 is a side elevational view of the same truck, showing, in section, a barrel mounted thereon; and Fig. 3 is a front elevational view of the lower part of the truck.

Referring to the figures of the drawing, the truck therein shown comprises an axle 2, to the ends of which are secured wheels 3. A shaft 4 is attached to the axle 2 midway between the wheels, and is provided at its outer end with the usual handle 5. The shaft 4 is composed of two spaced and parallel bars 6 secured together by means of pins 7 which are placed at intervals and serve to support at any desired height the hooked end 8 of a grappling-hook 9. The grappling-hook is curved, as shown, to extend around the bulge of the largest barrel to be handled, and is provided at its outer end with a gripping member 10 having inturned hooks 11.

A pair of curved side braces 12 is secured to the shaft 4 near the axle 2 by means of a bolt 13 and the ends of these braces are secured to the axle by means of bolts 14 and extend forward beyond the axle, as shown at 15, to form supports for a pair of toe-pieces 16 which are attached to the axle 2 by means of the bolts 14, and to the forward projections 15 of the side braces by means of bolts 17 surrounded by spacing collars 27. A barrel support is carried by the shaft 4 and the axle 2 and consists of a concave supporting portion 18, a downwardly bent forward portion 19 that is secured to the axle 2 by means of a bolt 20, and a U-shaped upper portion 21 that is secured to the shaft 4 by means of a bolt 22. A transverse barrel retainer is also provided to cooperate with the barrel support and consists of a U-shaped strap 23, the mid-portion of which is secured to the barrel support by means of a bolt 24, and the ends of which are secured to the axle 2 by means of the bolts 14, which also serve to fasten the side braces and the toe-pieces to the axle.

The top of the barrel retainer is provided with two or more studs 25 which engage the barrel and assist in preventing it from slipping from its support.

A foot rest 26 is secured to the shaft 4 at a convenient height to be used by the operator in loading and delivering the packages.

In the operation of the truck which I have herein shown and described, the grappling hook 9 is raised and the handle is raised to bring the barrel support against the side of the barrel to be carried.

In order to engage the supporting members of the truck with the barrel in their proper carrying position, the truck is tilted forward as far as the toe-pieces 16 will permit and the grappling hook is then placed over the bulge of the barrel. The operator then places his foot upon the footrest 26 and pulls down upon the handle 5 which brings the truck into the usual carrying position as shown in Fig. 2, with the barrel held securely by the grappling hook and the barrel support. To discharge the load, these movements are reversed, the truck being tilted forward and the grappling-hook raised. This may readily be done by the operator without assistance.

It is a special feature of advantage that the barrel support and retainer may be made of any desired height in accordance with the level on which the barrels are to be discharged. If the barrels are to be merely transferred from one place to another on the same level, these parts may be made only high enough to clear the wheels, while if, as is frequently the case, the barrels are to be delivered on a loading platform or scale which is somewhat higher than the floor from which the barrels are taken, the barrel support is made higher so that the barrel is lifted the necessary height from the floor and may be delivered directly to the platform or scale without the use of an inclined runway such as must be employed with the trucks which have heretofore been used for this purpose.

While I have shown herein a form of truck which is well adapted to the purpose described, it is to be understood that various changes in the construction and arrangement of parts may be made within the limits of my invention. It is therefore to be understood that the details of construction herein shown are illustrative only, and that the scope of my invention is indicated in the appended claims.

What I claim is:

1. In a barrel truck comprising a wheeled frame, a longitudinally curved barrel support carried by the said frame between the wheels thereof and extending transversely to the axis of the said wheels, and a barrel-retaining member disposed at the foot of said barrel support and extending transversely thereof.

2. A barrel truck comprising an axle, wheels carried thereby, a shaft connected to said axle, a longitudinally curved barrel-support extending longitudinally of said shaft and secured to said shaft and to the said axle, and a barrel-retaining member extending transversely of said barrel support at the foot thereof and secured to said axle.

3. A barrel truck comprising an axle, a pair of wheels secured thereto, a shaft secured to the said axle midway between its ends, a longitudinally curved barrel-supporting member secured to said shaft and spaced therefrom, and a barrel-retaining member extending transversely of said support at the foot thereof and secured to said support and to the said axle.

4. A barrel truck comprising an axle, a pair of wheels secured thereto, a shaft secured to the said axle midway between its ends, a concave barrel supporting member secured to the said shaft and spaced therefrom, and a U-shaped retaining member having its central portion secured to the lower end of the said barrel support and having its ends secured to the said axle, the said barrel retaining member being provided with studs to engage and hold the barrel and a grappling-hook carried by said shaft and curved to extend around the bulge of the barrel.

In testimony whereof, I, the said CHARLES W. CADE, have hereunto set my hand.

CHARLES W. CADE.

Witnesses:
R. D. BROWN,
JOHN F. WILL.